(12) United States Patent
Kweon et al.

(10) Patent No.: US 6,183,911 B1
(45) Date of Patent: Feb. 6, 2001

(54) POSITIVE ACTIVE MATERIAL FOR RECHARGEABLE LITHIUM BATTERY AND METHOD OF PREPARING SAME

(75) Inventors: Ho-Jin Kweon; Geun-Bae Kim, both of Chungcheongnam-do; Dong-Gon Park, Seoul, all of (KR)

(73) Assignee: Samsung Display Devices Co., Ltd. (KR)

( * ) Notice: Under 35 U.S.C. 154(b), the term of this patent shall be extended for 0 days.

(21) Appl. No.: 09/429,259

(22) Filed: Oct. 29, 1999

(30) Foreign Application Priority Data

Mar. 10, 1999 (KR) .................................... 99-7973

(51) Int. Cl.[7] .............................. H01M 4/50; H01M 4/58
(52) U.S. Cl. ...................... 429/224; 429/221; 429/231.1; 429/231.2; 429/231.6
(58) Field of Search ..................... 429/224, 221, 429/231.1, 231.2, 231.6

(56) References Cited

U.S. PATENT DOCUMENTS 6,037,095 * 3/2000 Miyasaka .......................... 429/218.1
6,040,087 * 3/2000 Kawakami ........................ 429/218.1

FOREIGN PATENT DOCUMENTS 52-137640 * 11/1977 (JP) .
53-91333 * 8/1978 (JP) .
53-107625 * 9/1978 (JP) .

* cited by examiner

Primary Examiner—Laura Weiner
(74) Attorney, Agent, or Firm—Blakely Sokoloff Taylor & Zafman

(57) ABSTRACT

A positive active material for rechargeable lithium batteries includes an active material component processed from a manganese-based compound. The transition metal compound is selected from $Li_xMnO_2$, $Li_xMnF_2$, $Li_xMnS_2$, $Li_xMnO_{2-z}F_z$, $Li_xMnO_{2-x}S_z$, $Li_xMn_{1-y}M_yO_2$, $Li_xMn_{1-y}M_yF_2$, $Li_xMn_{1-y}M_yS_2$, $Li_xMn_{1-y}M_yO_{2-z}F_z$, $Li_xMn_{1-y}M_yO_{2-z}S_z$, $Li_xMn_2O_4$, $Li_xMn_2F_4$, $Li_xMn_2S_4$, $Li_xMn_2O_{4-z}F_z$, $Li_xMn_2O_{4-z}S_z$, $Li_xMn_{2-y}M_yO_4$, $Li_xMn_{2-y}M_yF_4$, $Li_xMn_{2-y}M_yS_4$, $Li_xMn_{2-y}M_yO_{4-z}F_z$, or $Li_xMn_{2-y}M_yO_{4-z}S_z$ where $0<x\leq1.5$, $0.05\leq y\leq0.3$, $y\leq1.0$ and M is selected from Al, Co, Cr, Mg, Fe, La, Sr or Ce. A vanadium pentoxide is coated on the active material component.

5 Claims, 4 Drawing Sheets

US 6,183,911 B1

POSITIVE ACTIVE MATERIAL FOR RECHARGEABLE LITHIUM BATTERY AND METHOD OF PREPARING SAME

BACKGROUND OF THE INVENTION (a) Field of the Invention

The present invention relates to a positive active material for rechargeable lithium batteries and a method of preparing the same and, more particularly, to a manganese-based positive active material for rechargeable lithium batteries which has a good cycle life characteristic.

(b) Description of the Related Art

Generally, manganese-based compounds such as $LiMn_2O_4$ and $LiMnO_2$ are the positive active material of choice for rechargeable lithium batteries because of their low cost, abundance and environmentally friendly characteristics. Among such manganese-based compounds, $LiMn_2O_4$ is particularly stable for the battery use and thus attractive for the electric vehicle application.

However, as compared to other lithiated transition metal oxides such as $LiCoO_2$ and $LiNiO_2$, $LiMn_2O_4$ has a relatively low discharge capacity. Furthermore, when high rate of charge and discharge operations are cycled, the discharge capacity is excessively reduced. In particular, when the charge and discharge operations are continuously performed at high temperatures, manganese distributed in the surface of $LiMn_2O_4$ readily elutes to the electrolyte, causing a disproportionation reaction. This reaction seriously deteriorates the cycle life characteristic of the battery.

SUMMARY OF THE INVENTION

It is an object of the present invention to provide a manganese-based positive active material for rechargeable lithium batteries which exhibits a good cycle life characteristic at high temperatures.

This and other objects may be achieved by a positive active material for rechargeable lithium batteries including an active material component processed from a manganese-based compound. The manganese-based compound is selected from $Li_xMnO_2$, $Li_xMnF_2$, $Li_xMnS_2$, $Li_xMnO_{2-z}F_z$, $Li_xMnO_{2-z}S_z$, $Li_xMn_{1-y}M_yO_2$, $Li_xMn_{1-y}M_yF_2$, $Li_xMn_{1-y}M_yS_2$, $Li_xMn_{1-y}M_yO_{2-z}F_z$, $Li_xMn_{1-y}M_yO_{2-z}S_z$, $Li_xMn_2O_4$, $Li_xMn_2F_4$, $Li_xMn_2S_4$, $Li_xMn_2O_{4-z}F_z$, $Li_xMn_2O_{4-z}S_z$, $Li_xMn_{2-y}M_yO_4$, $Li_xMn_{2-y}M_yF_4$, $Li_xMn_{2-y}M_yS_4$, $Li_xMn_{2-y}M_yO_{4-z}F_z$, or $Li_xMn_{2-y}M_yO_{4-z}S_z$ where $0<x \leq 1.5$, $0.05 \leq y \leq 0.3$, $z \leq 1.0$ and M is selected from Al, Co, Cr, Mg, Fe, La, Sr or Ce. A vanadium pentoxide is coated on the active material component.

A method of preparing the positive active material is performed by obtaining a powder from a source material. The source material is selected from $Li_xMnO_2$, $Li_xMnF_2$, $Li_xMnS_2$, $Li_xMnO_{2-z}F_z$, $Li_xMnO_{2-z}S_z$, $Li_xMn_{1-y}M_yO_2$, $Li_xMn_{1-y}M_yF_2$, $Li_xMn_{1-y}M_yS_2$, $Li_xMn_{1-y}M_yO_{2-z}F_z$, $Li_xMn_{1-y}M_yO_{2-z}S_z$, $Li_xMn_2O_4$, $Li_xMn_2F_4$, $Li_xMn_2S_4$, $Li_xMn_2O_{4-z}F_z$, $Li_xMn_2O_{4-z}Sz$, $Li_xMn_{2-y}M_yO_4$, $Li_xMn_{2-y}M_yF_4$, $Li_xMn_{2-y}M_yS_4$, $Li_xMn_{2-y}M_yO_{4-z}F_z$, or $Li_xMn_{2-y}M_yO_{4-z}S_z$, where $0<x \leq 1.5$, $0.05 \leq y \leq 0.3$, $z \leq 1.0$ and M is selected from Al, Co, Cr, Mg, Fe, La, Sr or Ce. The powder is then coated with a vanadium pentoxide ($V_2O_5$) aqueous solution or a $V_2O_5$ alcoholic solution to make a $V_2O_5$ solution-coated powder. Thereafter, the $V_2O_5$ solution-coated powder is heat-treated to thereby prepare a $V_2O_5$-coated active material.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings, wherein.

DETAILED DESCRIPTION OF THE INVENTION

Figure 1:
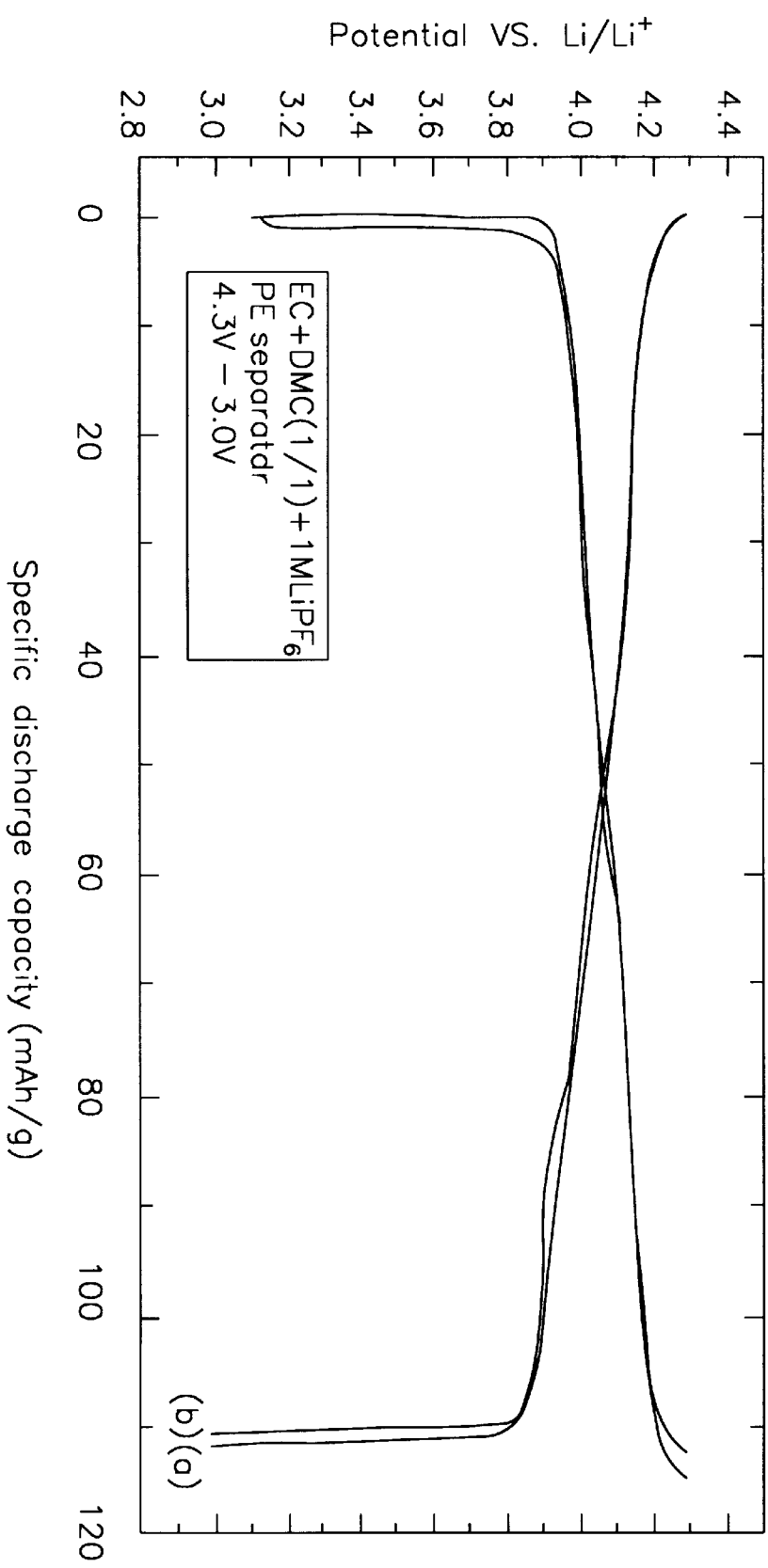
FIG. 1 is a graph illustrating charge and discharge characteristics of rechargeable lithium cells according to an example of the present invention and a comparative example.

In a method of preparing a positive active material for rechargeable lithium batteries, a powder, being an active material precursor, is first processed from a manganese-based compound. The manganese-based compound is selected from $Li_xMnO_2$, $Li_xMnF_2$, $Li_xMnS_2$, $Li_xMnO_{2-z}F_z$, $Li_xMnO_{2-z}S_z$, $Li_xMn_{1-y}M_yO_2$, $Li_xMn_{1-y}M_yF_2$, $Li_xMn_{1-y}M_yS_2$, $Li_xMn_{1-y}M_yO_{2-z}F_z$, $Li_xMn_{1-y}M_yO_{2-z}S_z$, $Li_xMn_2O_4$, $Li_xMn_2F_4$, $Li_xMn_2S_4$, $Li_xMn_2O_{4-z}F_z$, $Li_xMn_2O_{4-z}S_z$, $Li_xMn_{2-y}M_yO_4$, $Li_xMn_{2-y}M_yF_4$, $Li_xMn_{2-y}M_yS_4$, $Li_xMn_{2-y}M_yO_{4-z}F_z$, or $Li_xMn_{2-y}M_yO_{4-z}S_z$, where $0<x \leq 1.5$, $0.05 \leq y \leq 0.3$, $z \leq 1.0$ and M is selected from Al, Co, Cr, Mg, Fe, La, Sr, Ce or other transition or lanthanide metals. The powder processing step can be performed with a technique known in the related art.

Thereafter, the powder is coated with a vanadium pentoxide ($V_2O_5$) aqueous solution or a vanadium pentoxide alcoholic solution. The vanadium pentoxide aqueous solution or the vanadium pentoxide alcoholic solution preferably contains 0.1 to 30 weight percent of vanadium pentoxide. The vanadium pentoxide aqueous solution may be formed by mixing and refluxing water and vanadium oxide. In contrast, the vanadium pentoxide alcoholic solution may be formed by mixing and refluxing alcohol and vanadium pentoxide. The alcohol is preferably selected from methanol or ethanol. When vanadium pentoxide is less than 0.1 weight percent of water or alcohol, the coating effect of the vanadium pentoxide solution onto the powder is not induced. In contrast, when vanadium pentoxide is more than 30 weight percent of water or alcohol, the coating layer of the vanadium pentoxide solution becomes undesirably thick. A sputtering technique, a chemical vapor deposition (CVD) technique, a dip coating technique and other general-purpose coating techniques may be employed for the coating use. Among the techniques, the dip coating technique may be preferably used for coating the metallic alkoxide solution onto the powder.

The vanadium pentoxide solution-coated powder is then heat-treated at temperatures ranged from 100 to 1000° C. for 1 to 20 hours under an oxidation atmosphere where dry air or oxygen is blowing. As a result, a vanadium pentoxide-coated active material is prepared. When the heat-treating temperature is lower than 100° C., the vanadium pentoxide solution coated on the powder is not crystallized so that it prohibits free movement of lithium ions in the active material.

The vanadium pentoxide formed on the surface of the power may be derived from a single source of the vanadium pentoxide solution or composite sources of manganese of lithiated transition metal compound and the vanadium pentoxide solution. It is preferable that the thickness of the vanadium pentoxide layer reaches up to 1 to 100 nm.

This vanadium pentoxide coating method may be also applied to cobalt-based active material such as $LiCoO_2$ and $LiCo_{1-x}M_xO_2$ where $x \geq 0$ and M is metal, and nickel-based active material such as $LiNiO_2$, $LiNi_{1-x}M_xO_2$ where $x \geq 0$ and M is metal. However, in these applications, cobalt or nickel is liable to elute to an electrolyte.

The following examples further illustrate the present invention.

EXAMPLE 1

A vanadium pentoxide ($V_2O_5$) solution was prepared by dissolving a 1 g of vanadium pentoxide powder in per 100 g of distilled water. The 50 ml of vanadium pentoxide solution was then mixed with per a 100 g of $LiMn_2O_4$ powder such that an overall surface of the power became wet sufficiently by the solution, and dried. Thereafter, the dried mixture was heat-treated at about 600° C. for about 10 hours under a dry air atmosphere to thereby prepare a vanadium pentoxide-coated active material. Then, the active material was mixed with Super P carbon for a conductive agent, KF-1300 polyvinylidene fluoride for a binder and N-methylpyrrolidone for a solvent to prepare an active material slurry. The slurry is cast into a tape shape to act as a positive electrode. The positive electrode is then assembled with a lithium metal foil for an opposite pole by using a lithium salt solution for an electrolyte to thereby fabricate a coin cell-type half cell. The lithium salt solution contained 1:1 volume ratio of ethylene carbonate and dimethyl carbonate for a solvent and $LIPF_6$ for a solute.

EXAMPLE 2

The positive electrode preparing procedure was performed in the same way as in Example 1 with the exception that the heat-treating operation was performed at about 200° C. A coin-type half cell was fabricated with the resulting positive electrode in combination with other components as described in Example 1.

EXAMPLE 3

A vanadium pentoxide ($V_2O_5$) solution was prepared by dissolving a 1 g of vanadium pentoxide powder in per 100 g of distilled water. The 50 ml of vanadium pentoxide solution was then mixed with per a 100 g of $Li_xMn_{2-y}Al_yO_{4-z}F_z$ powder where $0<x\leq 1.5$, $0.05\leq y\leq 0.3$, $z\leq 1.0$ (Bell Communication Research, Inc.) such that an overall surface of the power became wet sufficiently by the solution, and dried. Thereafter, the dried mixture was heat-treated at about 200° C. for about 10 hours under a dry air atmosphere to thereby prepare a vanadium pentoxide-coated active material. Then, the active material was mixed with Super P carbon for a conductive agent, KF-1300 polyvinylidene fluoride for a binder and N-methylpyrrolidone for a solvent to prepare an active material slurry. The slurry is cast into a tape shape to act as a positive electrode. The positive electrode is then assembled with a lithium metal foil for an opposite pole by using a lithium salt solution for an electrolyte to thereby fabricate a coin cell-type half cell. The lithium salt solution contained 1:1 volume ratio of ethylene carbonate and dimethyl carbonate for a solvent and $LiPF_6$ for a solute.

EXAMPLE 4

The positive electrode preparing procedure was performed in the same way as in Example 3 with the exception that the heat-treating operation was performed at about 600° C. A coin-type half cell was fabricated with the resulting positive electrode in combination with other components as described in Example 3.

COMPARATIVE EXAMPLE 1

The positive electrode preparing procedure was performed in the same way as in Example 1 with the exception that the $LiMn_2O_4$ powder was directly used for the active material without the vanadium pentoxide coating operation. A coin-type half cell was fabricated with the resulting positive electrode in combination with other components as described in Example 1.

COMPARATIVE EXAMPLE 2

The positive electrode preparing procedure was performed in the same way as in Example 3 with the exception that the $Li_xMn_{2-y}Al_yO_{4-z}F_z$ powder was directly used for the active material without the vanadium pentoxide coating operation. A coin-type half cell was fabricated with the resulting positive electrode in combination with other components as described in Example 3.

Figure 2:
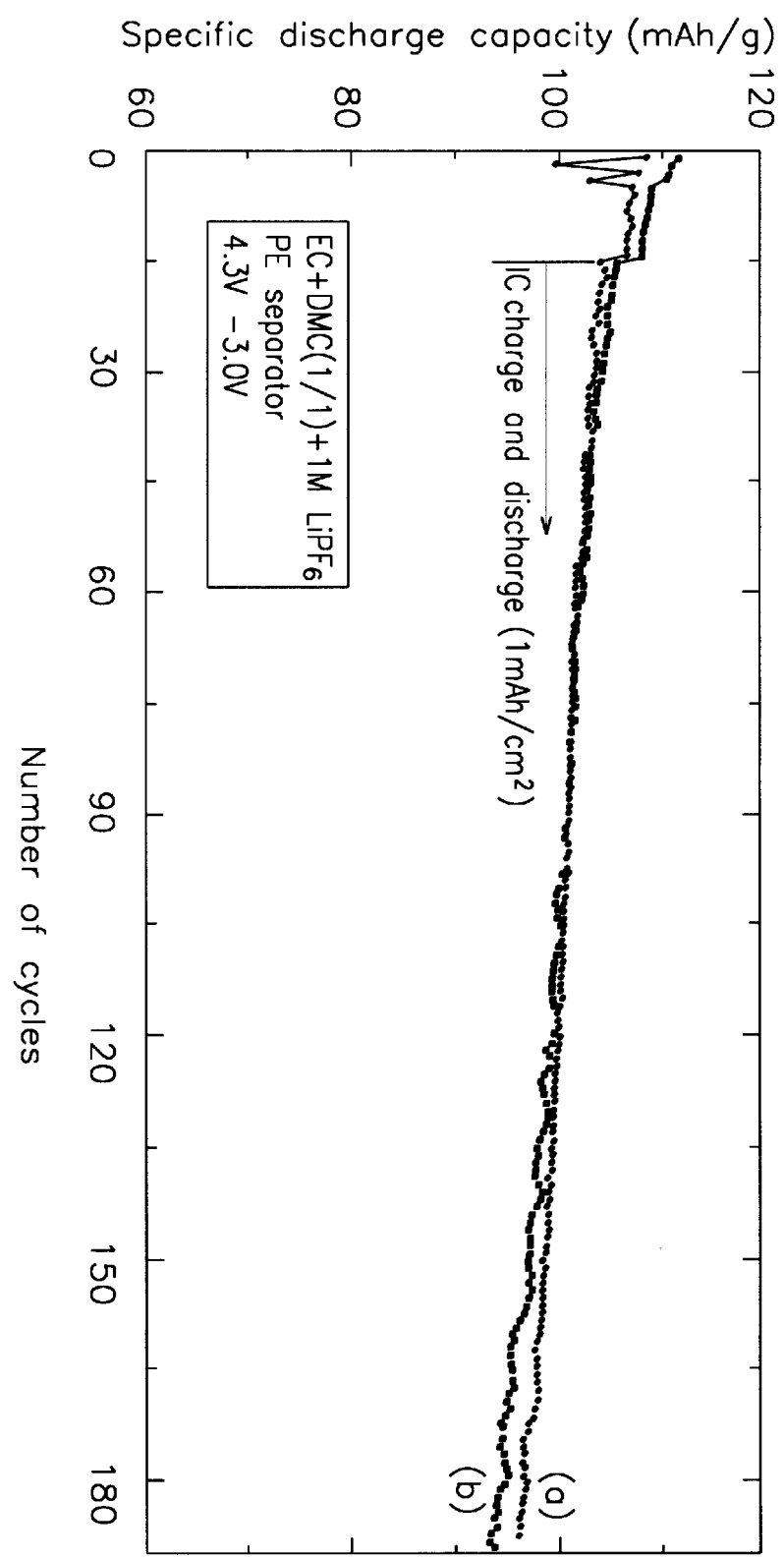
FIG. 2 is a graph illustrating ambient-temperature cycle life characteristics of the rechargeable lithium cells of FIG. 1.
Figure 3:
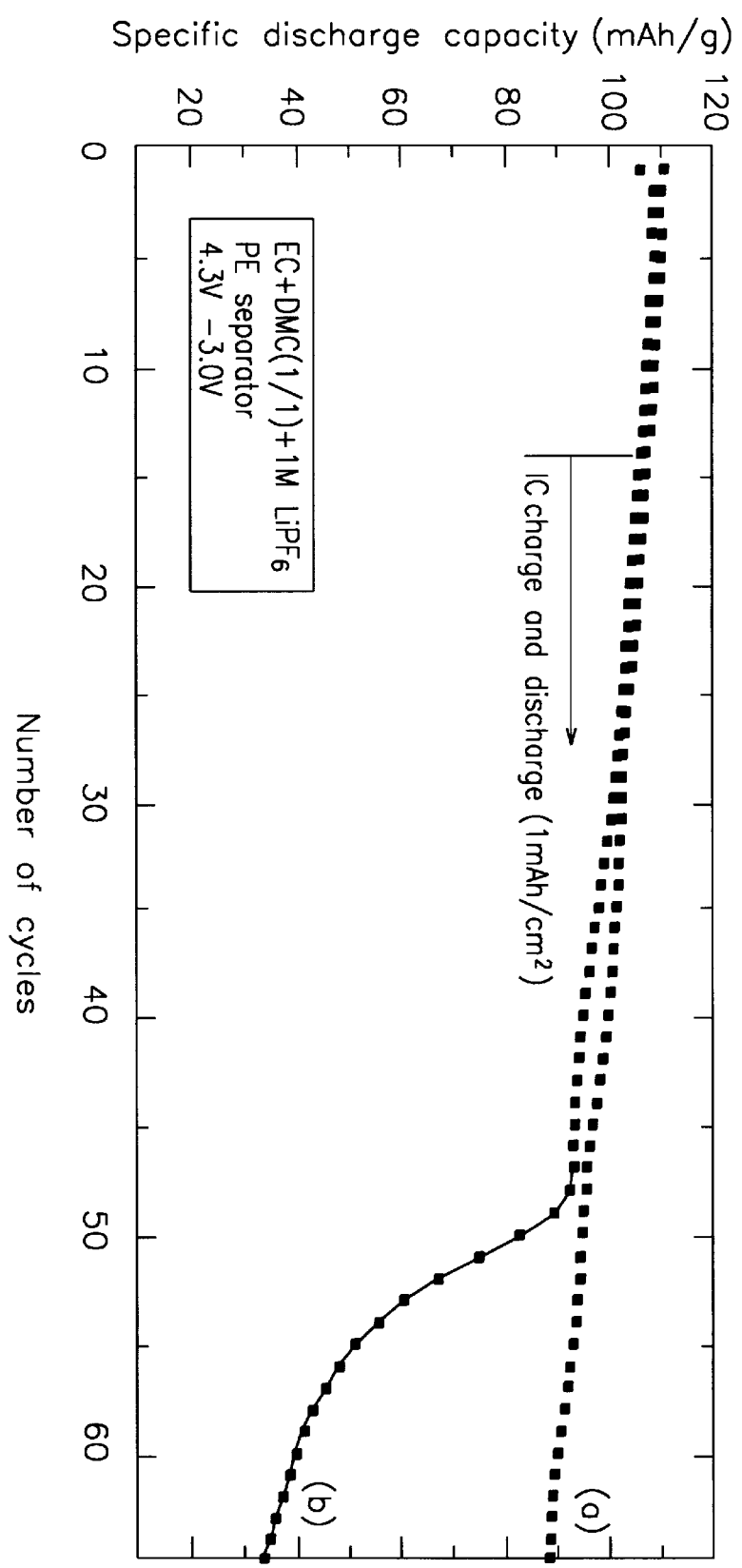
FIG. 3 is a graph illustrating high-temperature cycle life characteristics of the rechargeable lithium cells of FIG. 1.

The coin type cells fabricated according to Example 1 and Comparative Example 1 were charged and discharged at 25° C. from 0.1 C to 1 C rate over the voltage window between 4.3V and 3.0V. The charge and discharge characteristics of the cells in the early cycles were illustrated in FIG. 1. Further, the cycle life characteristics of the cells were illustrated in FIG. 2. In each of the figures, the charge and discharge characteristic of the cell according to Example 1 is indicated by a parenthesized alphabetic symbol "(a)" and that of the cell according to Comparative Example 1 is indicated by another symbol "(b)". As shown in FIGS. 1 and 2, the cell according to Example 1 exhibited a slightly lower specific capacity but a better cycle life characteristic at ambient temperatures than the cell according to Comparative Example 1. In addition, even when the charge and discharge operations of the cells are cycled at a high temperature of about 50° C., the cell according to Example 1, as shown in FIG. 3, exhibited a far better cycle life characteristic than the cell according to Comparative Example 1. It is presumed that the good cycle life characteristic of the cell is resulted because the vanadium pentoxide layer coated on the surface of the manganese-based active material component prevents elution of manganese to the electrolyte. The cells fabricated according to Examples 2 to 4 also exhibited the desired performance characteristic similar to that of Example 1.

Figure 4:
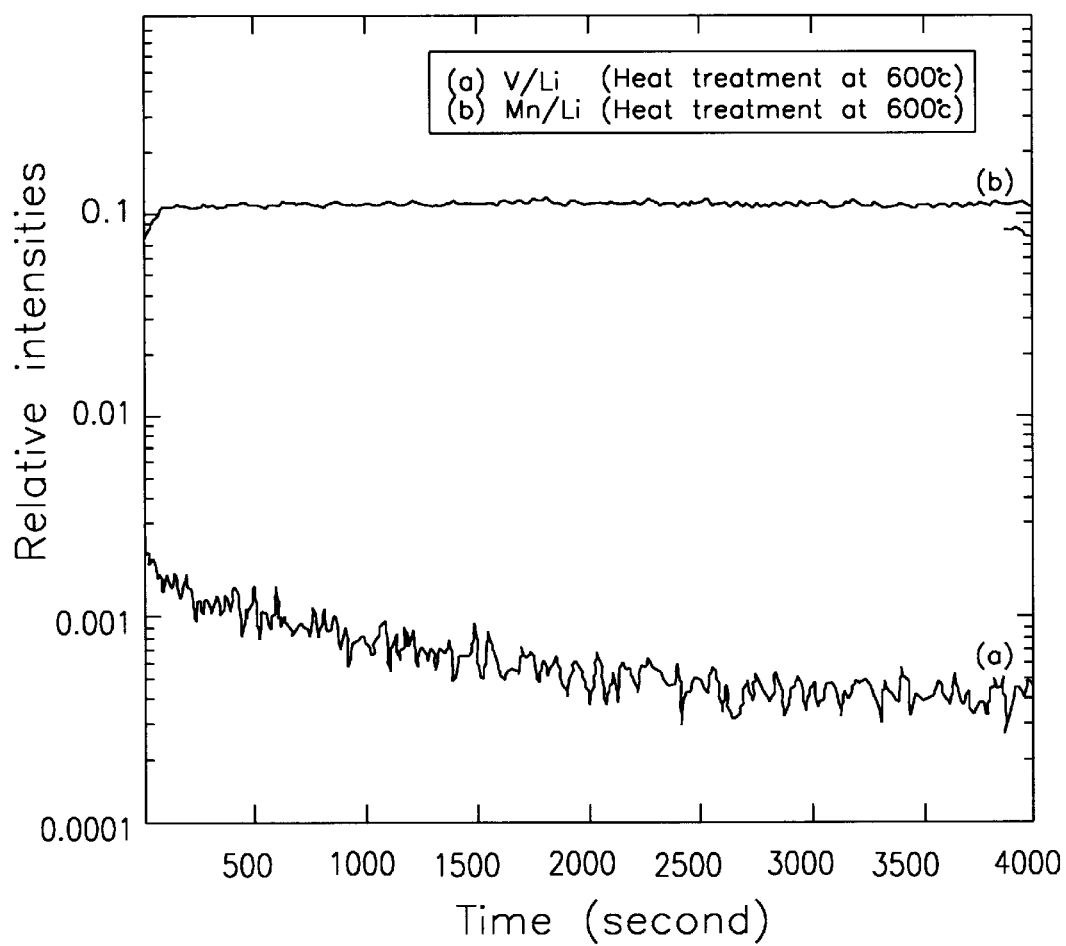
FIG. 4 is a graph illustrating SIMS analysis results with respect to the rechargeable lithium cell of FIG. 1 according to the example.

Meanwhile, a secondary ion mass spectrometry (SIMS) analysis was performed with respect to the positive active material prepared according to Example 1 to measure the component distribution ratio. The result was illustrated in FIG. 4. In the figure, the relative intensity of the vanadium component is indicated by a parenthesized alphabetic symbol "(a)" and that of the manganese component is indicated by another symbol "(b)". As shown in FIG. 4, it could be known that the vanadium component existed more in the surface portion of the active material and the manganese component existed more in the center portion of the active material. This proved that the overall surface of $LiMn_2O_4$ was completely coated with vanadium pentoxide.

As described above, the positive active material for rechargeable lithium batteries has a good high-temperature cycle life characteristic.

While the present invention has been described in detail with reference to the preferred embodiments, those skilled in the art will appreciate that various modifications and substitutions can be made thereto without departing from the spirit and scope of the present invention as set forth in the appended claims.

What is claimed is:

1. A positive active material for rechargeable lithium batteries, the positive active material comprising:

an active material component processed from a manganese-based compound, the manganese-based compound being selected from the group consisting of $Li_xMnO_2$, $Li_xMnF_2$, $Li_xMnS_2$, $Li_xMnO_{2-z}F_z$, $Li_xMnO_{2-z}S_z$, $Li_xMn_{1-y}M_yO_2$, $Li_xMn_{1-y}M_yF_2$, $Li_xMn_{1-y}M_yS_2$, $Li_xMn_{1-y}M_yO_{2-z}F_z$, $Li_xMn_{1-y}M_yO_{2-z}S_z$, $Li_xMn_2O_4$, $Li_xMn_2F_4$, $Li_xMn_2S_4$, $Li_xMn_2O_{4-z}F_z$, $Li_xMn_2O_{4-z}S_z$, $Li_xMn_{2-y}M_yO_4$, $Li_xMn_{2-y}M_yF_4$, $Li_xMn_{2-y}M_yS_4$, $Li_xMn_{2-y}M_yO_{4-z}F_z$, and $Li_xMn_{2-y}M_yO_{4-z}S_z$ where $0<x\leq1.5$, $0.05\leq y\leq0.3$, $z\leq1.0$ and M is selected from the group consisting of Al, Co, Cr, Mg, Fe, La, Sr and Ce; and a vanadium pentoxide ($V_2O_5$) coated on the active material component.

2. The positive active material of claim 1 wherein the vanadium pentoxide has a thickness ranged from 1 to 100 nm.

3. A method of preparing a positive active material for rechargeable lithium batteries, the method comprising the steps of:

obtaining a powder from a source material, the source material being selected from the group consisting of $Li_xMnO_2$, $Li_xMnF_2$, $Li_xMnS_2$, $Li_xMnO_{2-z}F_z$, $Li_xMnO_{2-z}S_z$, $Li_xMn_{1-y}M_yO_2$, $Li_xMn_{1-y}M_yF_2$, $Li_xMn_{1-y}M_yS_2$, $Li_xMn_{1-y}M_yO_{2-z}F_z$, $Li_xMn_{1-y}M_yO_{2-z}S_z$, $Li_xMn_2O_4$, $Li_xMn_2F_4$, $Li_xMn_2S_4$, $Li_xMn_2O_{4-z}F_z$, $Li_xMn_2O_{4-z}S_z$, $Li_xMn_{2-y}M_yO_4$, $Li_xMn_{2-y}M_yF_4$, $Li_xMn_{2-y}M_yS_4$, $Li_xMn_{2-y}M_yO_{4-z}F_z$, and $Li_xMn_{2-y}M_yO_{4-z}S_z$ where $0<x\leq1.5$, $0.05\leq y\leq0.3$, $z\leq1.0$ and M is selected from the group consisting of Al, Co, Cr, Mg, Fe, La, Sr and Ce;

coating the powder with a vanadium pentoxide aqueous solution or a vanadium pentoxide alcoholic solution to make an vanadium pentoxide solution-coated powder; and heat-treating the vanadium pentoxide solution-coated powder to prepare a vanadium pentoxide-coated active material.

4. The method of claim 3 wherein the vanadium pentoxide aqueous solution or the vanadium pentoxide alcoholic solution contains a 0.1 to 30 weight percent of vanadium component.

5. The method of claim 3 wherein the heat-treating step is performed at temperatures ranged from 100 to 1000° C. for 1 to 20 hours.

* * * * *

UNITED STATES PATENT AND TRADEMARK OFFICE
CERTIFICATE OF CORRECTION

PATENT NO. : 6,183,911 B1
DATED : February 6, 2001
INVENTOR(S) : Kweon et al.

Page 1 of 1

It is certified that error appears in the above-identified patent and that said Letters Patent is hereby corrected as shown below:

<u>Title page,</u>
Item [57], ABSTRACT, line 5, please delete "$Li_xMnO_{2-x}S_z$," and insert -- $Li_xMnO_{2-z}S_z$ --.

Signed and Sealed this

Nineteenth Day of March, 2002

Attest:

JAMES E. ROGAN
*Director of the United States Patent and Trademark Office*

*Attesting Officer*